(12) United States Patent  
Lee

(10) Patent No.: US 11,213,956 B2
(45) Date of Patent: Jan. 4, 2022

(54) ROBOT SYSTEM AND METHOD FOR CONTROLLING THE SAME

(71) Applicant: LG ELECTRONICS INC., Seoul (KR)

(72) Inventor: Wonhee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 260 days.

(21) Appl. No.: 16/598,565

(22) Filed: Oct. 10, 2019

(65) Prior Publication Data

US 2020/0039083 A1 Feb. 6, 2020

(30) Foreign Application Priority Data

Sep. 17, 2019 (KR) .......................... 10-2019-0114083

(51) Int. Cl.
*B25J 13/08* (2006.01)
*B25J 9/16* (2006.01)
*G06F 3/0484* (2013.01)
*G06F 3/0488* (2013.01)

(52) U.S. Cl.
CPC ........... *B25J 13/081* (2013.01); *B25J 9/1697* (2013.01); *G06F 3/0488* (2013.01); *G06F 3/04845* (2013.01)

(58) Field of Classification Search
CPC ... B25J 13/081; B25J 9/1697; G06F 3/04845; G06F 3/0488
See application file for complete search history.

(56) References Cited

U.S. PATENT DOCUMENTS

| | | | |
|---|---|---|---|
| 7,489,303 B1 * | 2/2009 | Pryor | B60K 35/00 345/173 |
| 9,418,421 B1 * | 8/2016 | Neishaboori | B25J 9/1697 |
| 10,034,582 B2 * | 7/2018 | Farahbakhsh | A47D 5/00 |
| 2020/0359845 A1 * | 11/2020 | Carlos | A47J 36/321 |
| 2020/0397193 A1 * | 12/2020 | Han | A47J 27/64 |

* cited by examiner

*Primary Examiner* — Nicholas Kiswanto
(74) *Attorney, Agent, or Firm* — Birch, Stewart, Kolasch & Birch, LLP

(57) ABSTRACT

Provided is a robot system. The robot system includes a manipulator configured to perform a preset operation on a plurality of objects, a transparent cover configured to define a chamber in which the plurality of objects and the manipulator are accommodated, the transparent cover being provided with a touch panel, a camera installed to face an internal region of the chamber, a projector configured to emit light to one area within the chamber, and a controller configured to control the projector so that the projector emits the light to a target area corresponding to a touch point of the touch panel, recognize a target object disposed in the target area based on image information of the camera, and control the manipulator so that an operation is performed on the target object.

18 Claims, 12 Drawing Sheets

ROBOT SYSTEM AND METHOD FOR CONTROLLING THE SAME

CROSS-REFERENCE TO RELATED APPLICATIONS

The present application claims priority under 35 U.S.C. 119 and 35 U.S.C. 365 to Korean Patent Application No. 10-2019-0114083 filed on 17 Sep. 2019, which is hereby incorporated by reference in its entirety.

BACKGROUND

The present disclosure relates to a robot system and a method for controlling the same.

In general, a machine that uses electric or magnetic action to perform a motion similar to the human's motion is called a robot. Recently, robots have been utilized in various fields due to the development of control technology. For example, the robots may be utilized in fields such as surgical robots, housekeeping robots, service robots, aerospace remote robots, dangerous goods handling robots, and the like. Such a robots performs an operation by using a manipulator that moves close to the movement of the arms or hands by electrical and mechanical mechanisms.

In particular, the housekeeping robot may perform a specific operation by coupling a specific tool to the manipulator. For example, the cooking robot may perform cooking by coupling various tools such as ladles, tongs, pots, and the like to the manipulator.

SUMMARY

Embodiments provide a robot system that is capable of being intuitively controlled and a method for controlling the same.

Embodiments also provide a robot system that secures safety of a user and a method for controlling the same.

In one embodiment, a robot system includes: a manipulator configured to perform a preset operation on a plurality of objects; a transparent cover configured to define a chamber in which the plurality of objects and the manipulator are accommodated, the transparent cover being provided with a touch panel; a camera installed to face an internal region of the chamber; a projector configured to emit light to one area within the chamber; and a controller configured to control the projector so that the projector emits the light to a target area corresponding to a touch point of the touch panel, recognize a target object disposed in the target area based on image information of the camera, and control the manipulator so that an operation is performed on the target object.

The target area may overlap the touch point in a direction perpendicular to the touch panel.

The controller may control, when a preset first gesture is inputted into the touch panel, the manipulator to perform a first action corresponding to the first gesture, and control, when a preset second gesture different from the preset first gesture is inputted into the touch panel, the manipulator to perform a second action corresponding to the preset second gesture and different from the first action.

The manipulator may include: a plurality of arms; and a gripper provided on an end arm of the plurality of arms. The controller may control, when a preset pattern is inputted into the touch screen in a state in which a preset object is gripped by the gripper, the manipulator to perform an action corresponding to the preset pattern.

The manipulator may include: a plurality of arms; and a gripper provided on an end arm of the plurality of arms. The controller may control, when a pitch-to-zoom gesture is inputted into the touch panel, the manipulator to allow the gripper to grip or release the target object.

The controller may control, when a drag gesture is inputted into the touch panel in a state in which the target object is gripped by the gripper, the manipulator to allow the target object to move in a direction of the drag gesture.

The controller may control the manipulator to allow the target object to move by a distance between a start point and an end point of the drag gesture.

The projector may be provided in plurality, which are spaced apart from each other to supplement a blind spot, and the camera may be provided in plurality, which are spaced apart from each other to supplement a blind spot.

The robot system may further include: a base disposed below the transparent cover to cover a bottom surface of the chamber; and a robot body which is seated on the base and on which the manipulator is mounted. The transparent cover may cover at least a portion of a circumferential surface of the chamber and a top surface of the chamber.

The robot system may further include: a base disposed below the transparent cover to cover a bottom surface of the chamber; and a ceiling which is disposed above the transparent cover to cover a top surface of the chamber and on which the manipulator is hung to be supported. The transparent cover may cover at least a portion of a circumferential surface of the chamber.

In another embodiment, a method for controlling a robot system includes: setting a target area corresponding to a touch point inputted into a touch panel provided on a transparent cover; performing pointing on the target area, which is disposed within a chamber covered by the transparent cover, by using a projector; performing targeting to recognize a target object disposed on the target area based on image information of the camera; and performing a preset operation on the target object by using a manipulator accommodated in the chamber.

During the preset operation, when a preset first gesture is inputted into the touch panel, the manipulator may perform a first action corresponding to the preset first gesture, and when a preset second gesture different from the preset first gesture is inputted into the touch panel, the manipulator may perform a section action corresponding to the preset second gesture and different from the first action.

The manipulator may include: a plurality of arms; and a gripper provided on an end arm of the plurality of arms. During the preset operation, when a preset pattern is inputted into the touch screen in a state in which a preset object is gripped by the gripper, the manipulator may perform an action corresponding to the preset pattern.

The manipulator may include: a plurality of arms; and a gripper provided on an end arm of the plurality of arms. During the preset operation, when a pinch-to-zoom gesture is inputted into the touch panel, the gripper may grip or release the target object.

During the preset operation, when a drag gesture is inputted into the touch panel in a state in which the target object is gripped by the gripper, the manipulator may allow the target object to move in a direction of the drag gesture.

The manipulator may allow the target object to move by a distance between a start point and an end point of the drag gesture.

The projector may be provided in plurality, which are spaced apart from each other to supplement a blind spot. The performing of the pointing may include: determining one projector that is capable of emitting light to the target area among the plurality of protectors; and emitting the light to the target area by using the one projector.

The camera may be provided in plurality, which are spaced apart from each other to supplement a blind spot. The performing of the targeting may include: determining one camera that is capable of acquiring image information of the target area among the plurality of cameras; and recognizing the target area based on the image information of the one camera.

The details of one or more embodiments are set forth in the accompanying drawings and the description below. Other features will be apparent from the description and drawings, and from the claims.

DETAILED DESCRIPTION OF THE EMBODIMENTS

Figure 1:
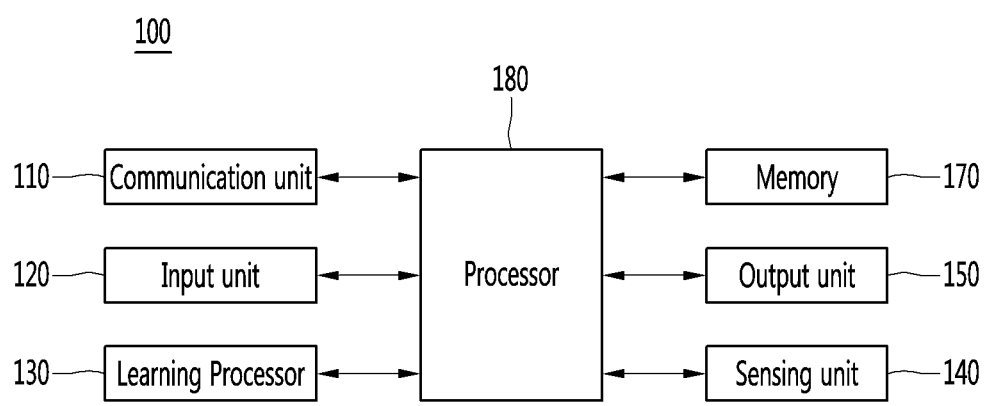
FIG. 1 illustrates an AI device 100 including a robot according to an embodiment.

Hereinafter, detailed embodiments of the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
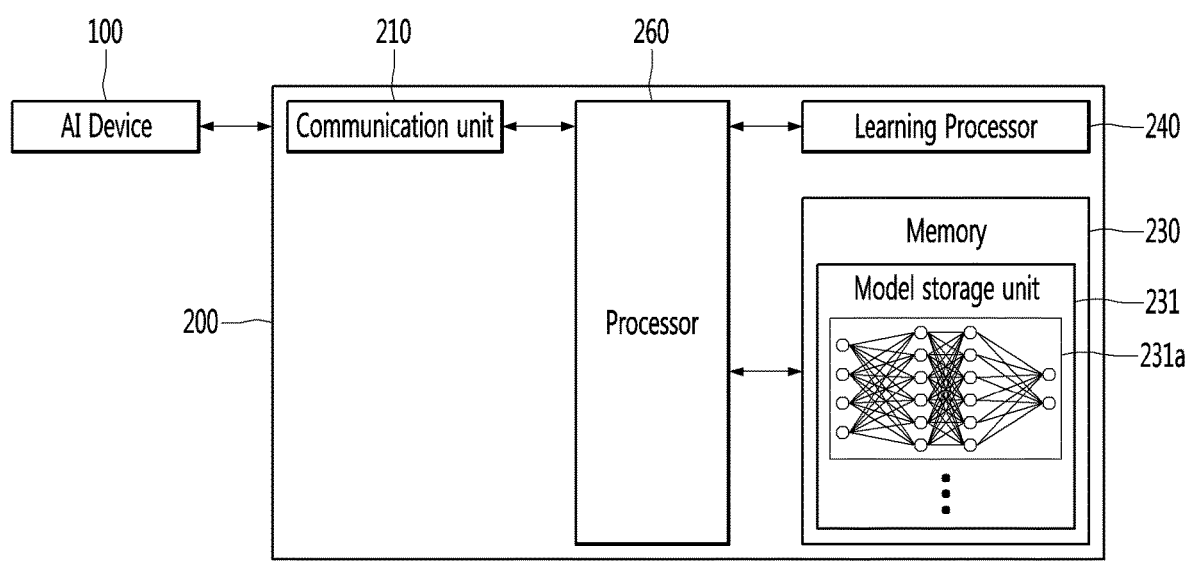
FIG. 2 illustrates an AI server 200 connected to a robot according to an embodiment.

FIG. 2 illustrates an AI server 200 connected to a robot according to an embodiment.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may inter the result value for new input data by using the learning model and may generate a response or a control command based on the inferred result value.

Figure 3:
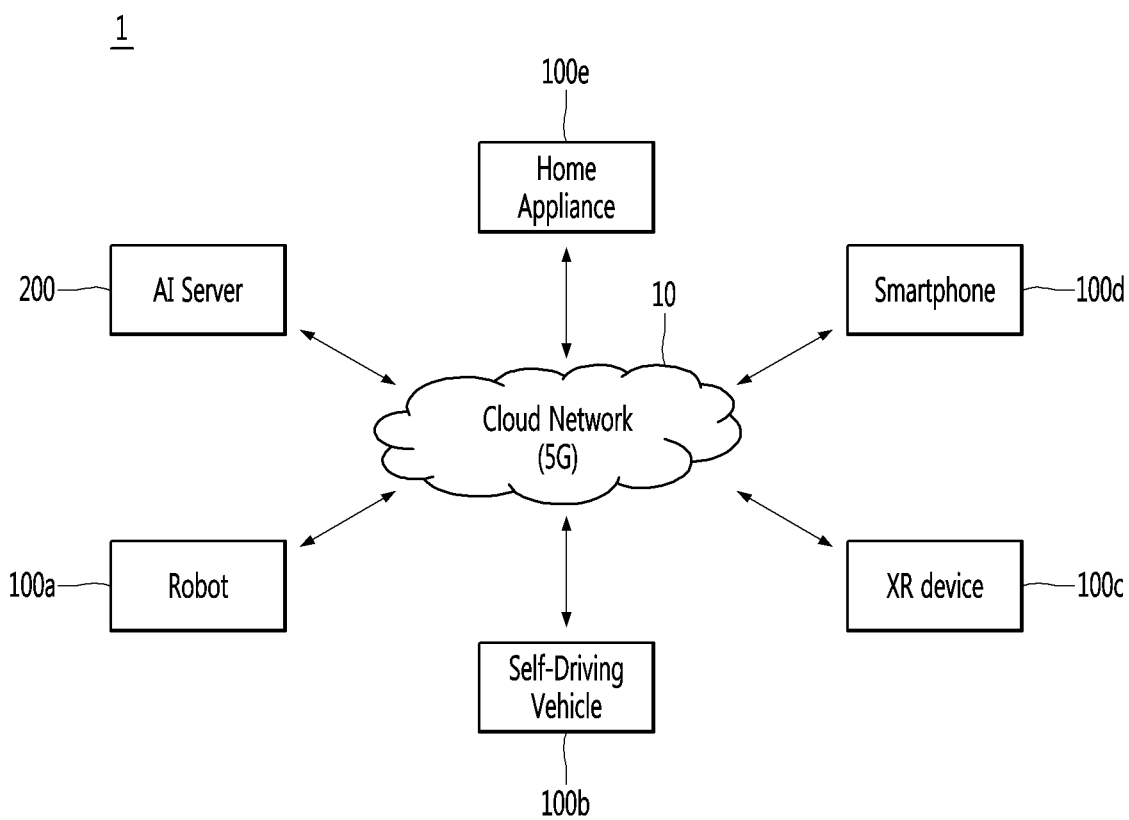
FIG. 3 illustrates an AI system 1 according to an embodiment.

FIG. 3 illustrates an AI system 1 according to an embodiment.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
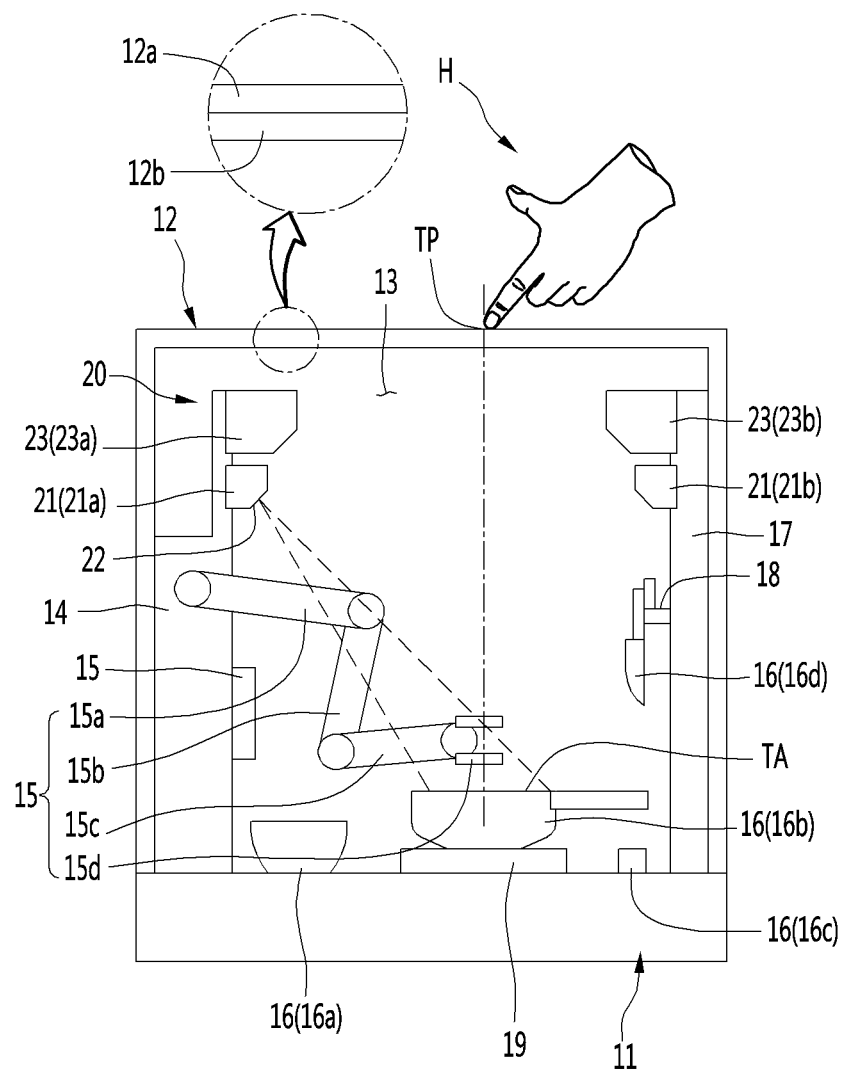
FIG. 4 is a schematic view of a robot system according to an embodiment.
Figure 5A:
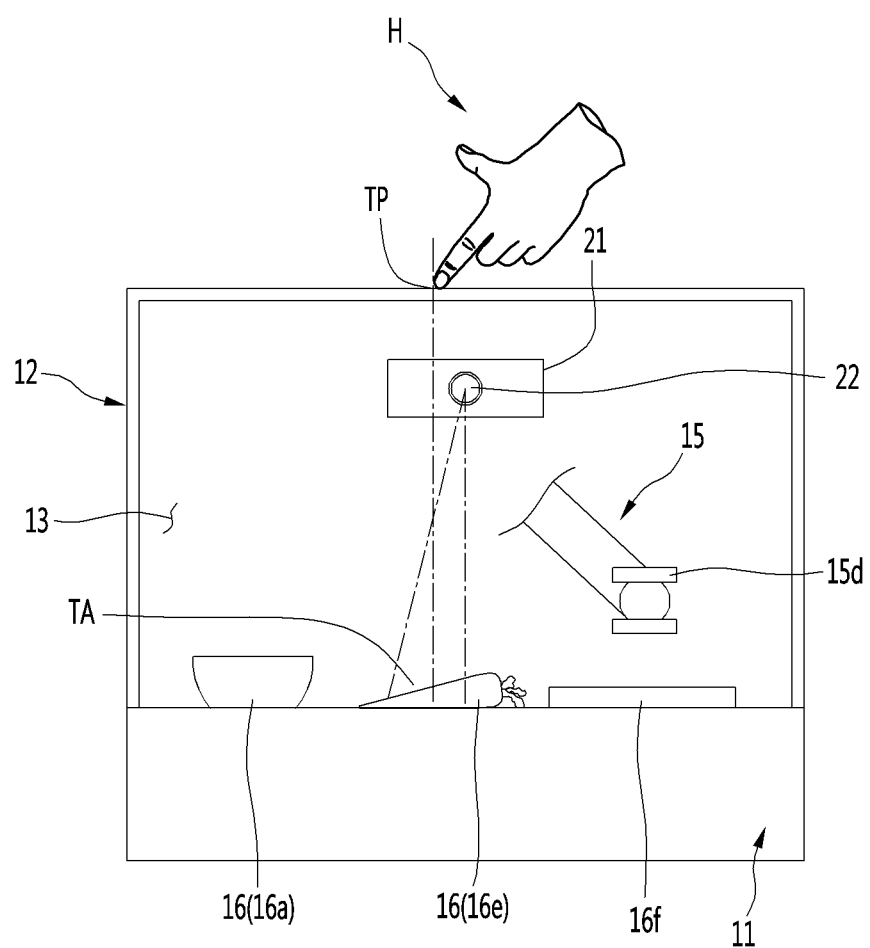
FIGS. 5A to 5C are views for explaining an example of an operation of the robot system according to an embodiment.
Figure 5B:
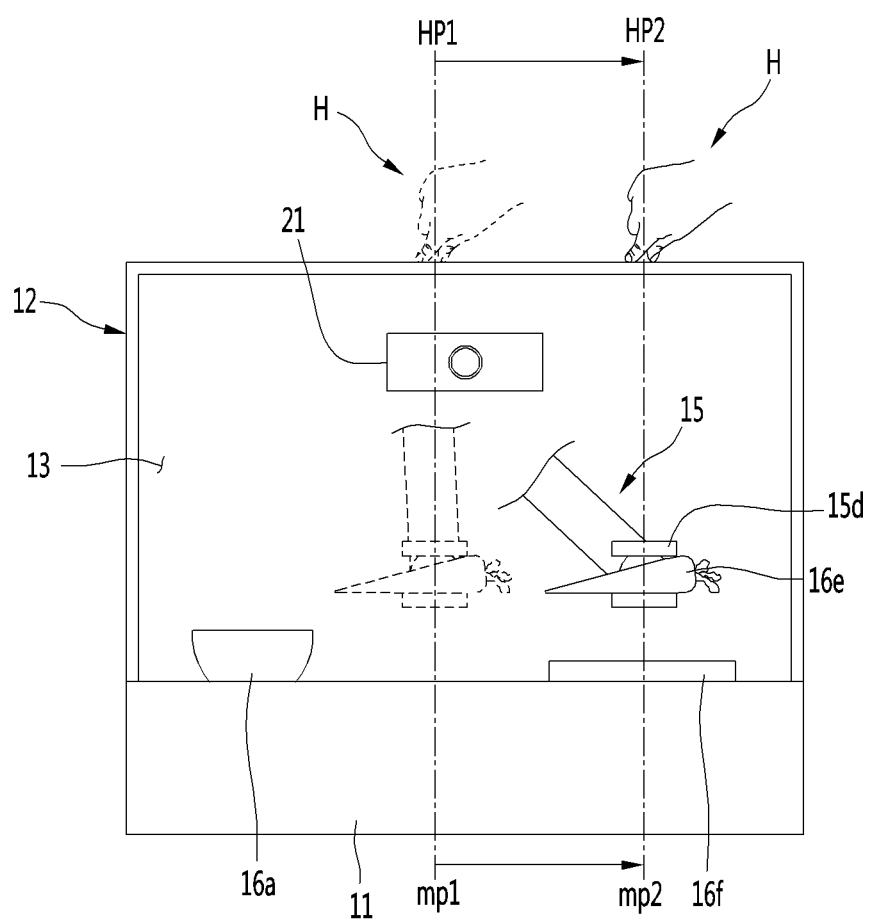
Figure 5C:
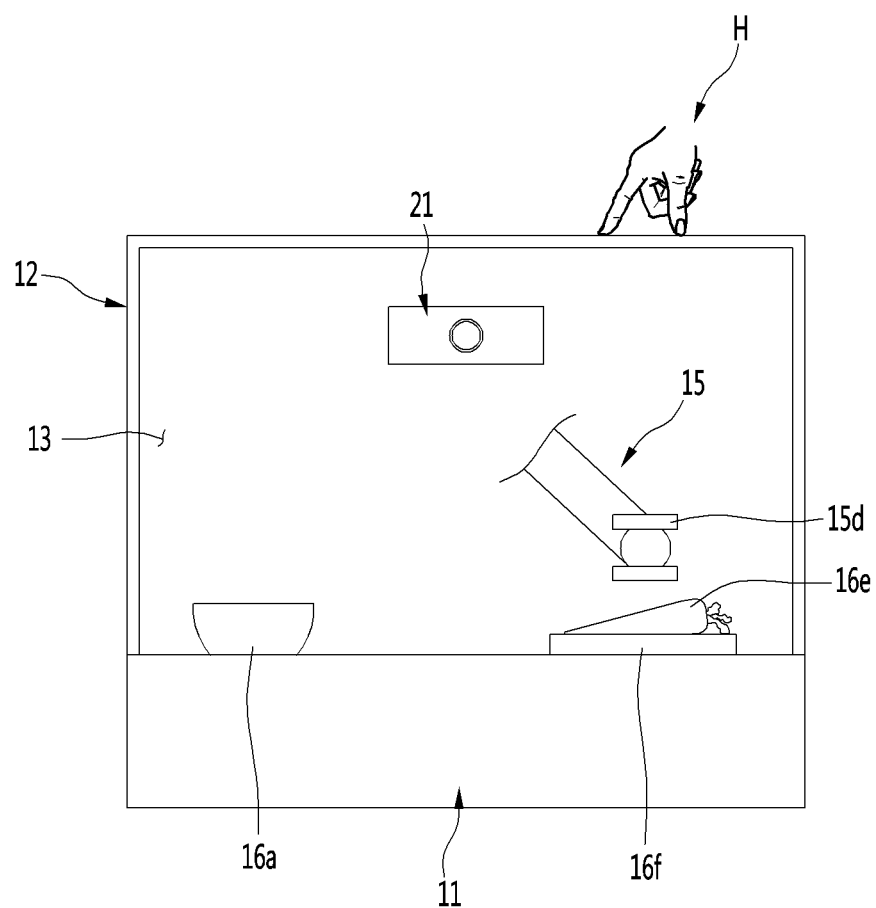
Figure 6A:
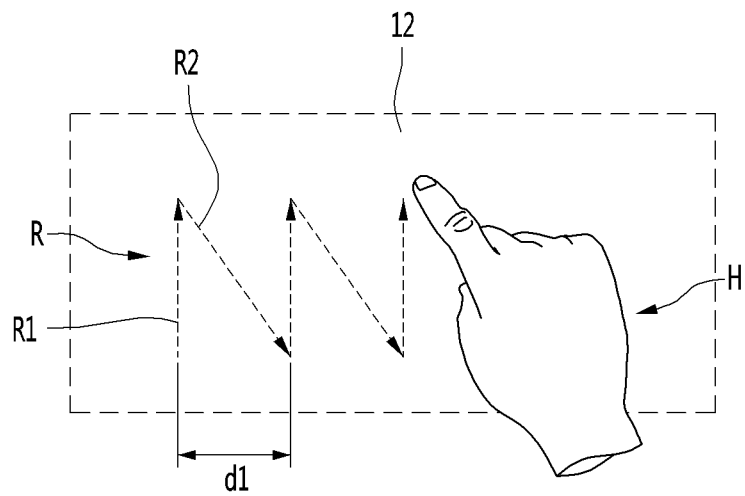
FIGS. 6A and 6B are views for explaining another example of the operation of the robot system according to an embodiment.
Figure 6A:
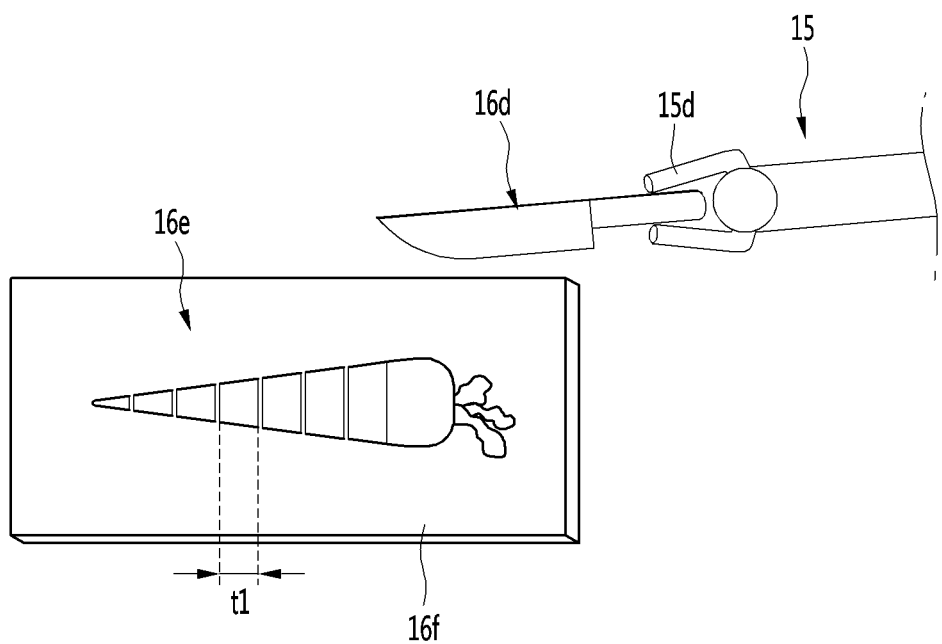
Figure 6B:
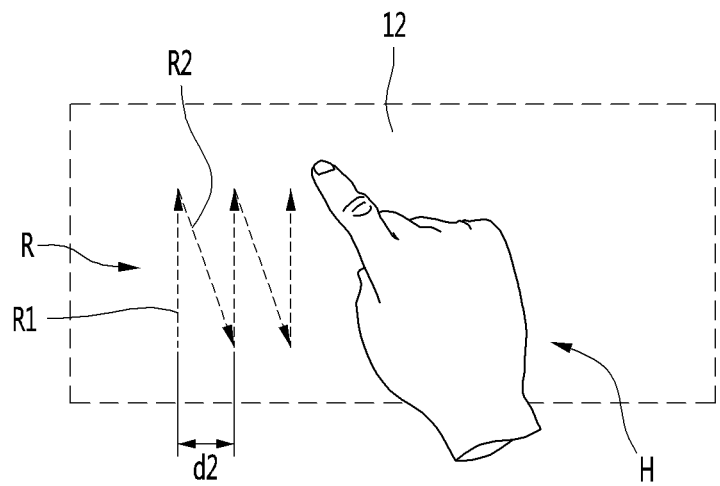
Figure 6B:
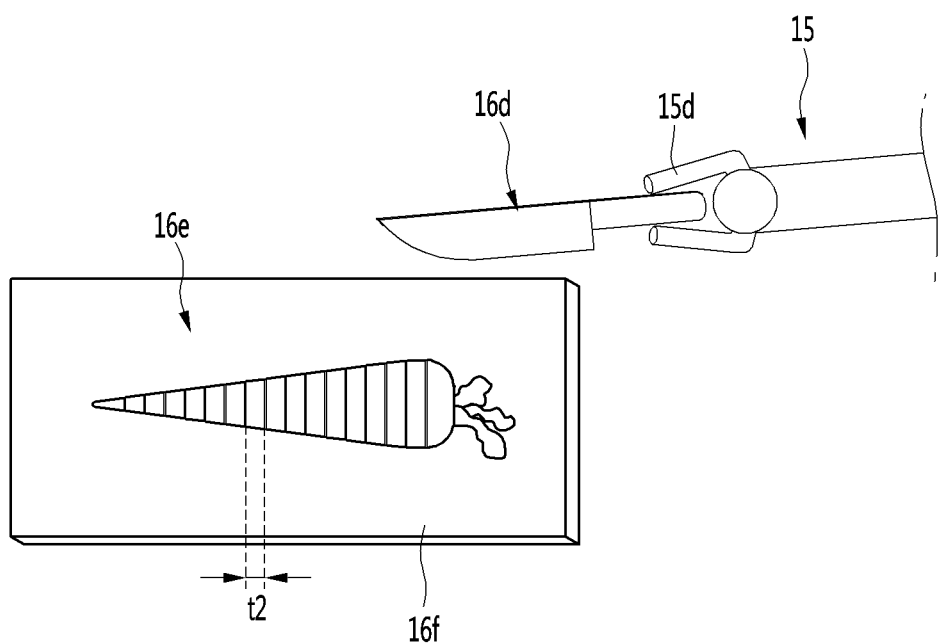
Figure 7:
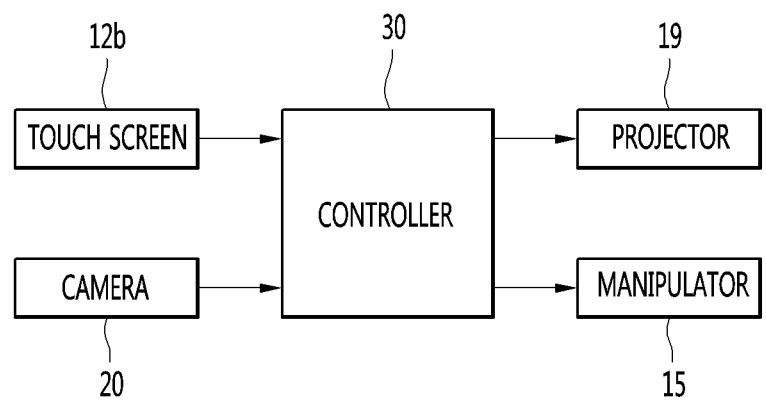
FIG. 7 is a control block diagram according to an embodiment.

FIG. 4 is a schematic view of a robot system according to an embodiment, FIGS. 5A to 5C are views for explaining an example of an operation of the robot system according to an embodiment, FIGS. 6A and 6B are views for explaining another example of the operation of the robot system according to an embodiment, and FIG. 7 is a control block diagram according to an embodiment.

A robot system according to this embodiment may represent the robot 100a described above. Hereinafter, a case in which the robot system is a cooking robot system will be described as an example, but the scope of the present disclosure is not limited thereto.

The robot system according to this embodiment may include a base 11, a transparent cover 12, a manipulator 15, a projector 21, and a camera 23.

The base 11 may support the robotic system.

The transparent cover 12 may be disposed on the base 11. The transparent cover 12 may define a chamber 13, which is an inner space. For example, the transparent cover 12 may have a box shape with a bottom surface opened, and the opened bottom surface of the transparent cover 12 may be covered by the base 11. That is, the base 11 may cover the bottom surface of the chamber 13. The transparent cover 12 may cover at least a portion of a circumferential surface of the chamber 13 and a top surface of the chamber 13.

The transparent cover 12 may include a transparent material. Thus, the user may directly see the inside of the chamber 13 through the transparent cover 12.

In more detail, the transparent cover 12 may include a window 12a defining an outer surface of the transparent cover 12 and a touch panel 12b provided inside the window 12a.

The touch panel 12b may be a capacitive touch panel. The touch panel 12b may receive touch by the user's hand H. In more detail, the user's hand H may touch the window 12a, and the touch panel 12b may detect the touch of the user's hand H. Thus, the touch of the touch panel 12b or the input of the touch panel 12b may be understood as touching the window 12a disposed on the touch panel 12b.

However, the touch input of the touch panel 12b is not limited to the hand H, and the touch panel 12b may also receive touch through an input tool such as a touch fan. Since the detailed configuration and principle of the touch panel 12b are well known technologies, detailed descriptions thereof will be omitted.

The touch panel 12b may be provided on at least one surface of the transparent cover 12. For example, the touch panel 12b may be provided on the top surface of the transparent cover 12.

The manipulator 15 and a plurality of objects 16 may be accommodated in the chamber 13 defined by the transparent cover 12.

The manipulator 15 may be mounted to a robot body 14 seated on the base 11. That is, the manipulator 15 may be a robot arm. For example, the manipulator 15 may be provided in a pair, which are respectively mounted on both sides of the robot body 14. The robot body 14 may be accommodated in the chamber 13, like the manipulator 15.

In more detail, the manipulator 15 may include a plurality of arms 15a, 15b, and 15c and a gripper 15d. Hereinafter, a case in which the plurality of arms 1ba, 1bb, and 15c includes a first arm 15a, a second arm 15b, and a third arm 15c, which will be described as an example.

The first arm 15a may be connected to the robot body 14. The robot body 14 may be provided with a first actuator (not shown) that allows the first arm 15a to rotate with respect to the robot body 14.

The second arm 15b may be connected to an end of the first arm 15a. The first arm 15a may be provided with a second actuator (not shown) that allows the second arm 15b to rotate with respect to the first arm 15a.

The third arm 15c may be connected to the end of the second arm 15b. The second arm 15b may be provided with a third actuator (not shown) that allows the third arm 15c to rotate with respect to the second arm 15b. The third arm 15c may be an end arm.

Rotation axes of the first arm 15a, the second arm 15b, and the third arm 15c may be the same or different from each other. For example, the rotation shafts of the first arm 15a and the second arm 15b may be lengthily provided in left and right directions, and the rotation shaft of the third arm 15c may be lengthily provided in a vertical direction. That is, the first arm 15a and the second arm 15b may rotate vertically, and the third arm 15c may rotate horizontally.

The gripper 15d may be provided on the end arm of the plurality of arms 15a, 15b, and 15c. That is, the gripper 15d may be provided on an end of the third arm 15c. The gripper 15d may be configured to selectively grip or release the object 16. The gripper 15d may be a robot hand. The configuration of the gripper 15d is not limited. For example, the gripper 15d may include a pair of fingers and an actuator that adjusts a distance between the pair of fingers.

The manipulator 15 may perform a preset operation on the plurality of objects 16.

Hereinafter, a case in which the plurality of objects includes a first object 16a to a sixth object 16f will be described as an example.

The first object 16a to the sixth object 16f may be different types of objects. The first object 16a is a bowl, the second object 16b is a cooking container (e.g., a pan or frying pan), and the third object 16c is an input unit for controlling a heating unit 19. Also, the fourth object 16d is a cooking tool (for example, a knife or ladle), the fifth object 16e is a material (for example, a vegetable), and the sixth object 16f is a cooking board (e.g., a cutting board).

Each of the first object 16a to the sixth object 16f may be provided in one or plurality.

The vessel 16a may be seated on an upper side of the base 11. The manipulator 15 may grip the vessel 16a to allow the vessel 16a to move.

The cooking container 16b may be seated on an upper side of the heating unit 19 provided on the top surface of the base 11. The heating unit 19 may include at least one of a gas range or an induction. The heating unit 19 may heat the cooking container 16b, and food contained in the cooking container 16b may be cooked.

The manipulator 15 may grip the cooking container 16b to allow the second object 16b to move. For example, the manipulator 15 may allow the cooking container 16b to move to an upper side of the bowl 16a while gripping the cooking container 16b. In addition, the manipulator 15 may tilt the cooking container 16b to transfer the food in the cooking container 16b to the bowl 16a.

The heating unit 19 may be controlled to be turned on and off and be controlled in heating temperature according to a command inputted through the input unit 16c. For example, the input unit 16c may include at least one of a rotary knob or a button. The manipulator 15 may control the heating unit 19 by rotating the rotary knob or pressing the button.

The cooking tool 16d may be mounted on the mounter 18 provided above the base 11. The mounter 18 may be spaced upward from the base 11. The mounter 18 may be coupled to the supporter 17 to be described later. However, the embodiment is not limited thereto, and the mounter 18 may be coupled to the robot body 14.

The manipulator 15 may perform a preset operation in a state of gripping the cooking tool 16d. For example, the manipulator 15 may trim the material 16e by using the knife in a state of gripping the knife. For another example, the manipulator 15 may scoop up soup contained in the cooking container 16b in the state of gripping the ladle so as to be transferred to the bowl.

The material 16e may be contained and stored in a basket (not shown) or a storage box (not shown), which is provided on the top surface of the base 11. The manipulator 15 may grip the material 16e to allow the material 16e to move.

Also, the manipulator 15 may trim the material 16e in a state of gripping the cooking tool 16d.

The cooking board 16f may be seated on the top surface of the base 11. The manipulator 15 may allow the cooking board 16f to move by gripping the cooking board 16f. Also, the manipulator 15 may allow the material 16e to move to the cooking board 16f and may clean the material 16e placed on the cooking board 16f in the state of gripping the cooking tool 16d.

The projector 21 may emit light to one area inside the chamber 13. That is, the projector 21 may point one area inside the chamber 13. The projector 21 may be disposed inside the chamber 13. In more detail, the projector 21 may be disposed inside an upper portion of the chamber 13 and may face a lower side.

The projector 21 may allow the area to which the light is emitted, i.e., a pointing area to vary. The pointing area may represent a target area TA. For this, since the internal configuration of the projector 21 is a well-known technology, detailed description thereof will be omitted.

In more detail, light emitted from a lens 22 of the projector 21 may be emitted to the target area TA, which will be described later, and the user may immediately identify the target area TA to which the light is emitted through the transparent cover 12. The target area TA may have a size that is capable of clearly distinguishing the target object from the plurality of objects 16.

The target area TA may overlap a touch point TP in the direction perpendicular to the touch panel 12b. That is, a virtual line perpendicular to the touch panel 12b and passing through the touch point TP may pass through the target area TA. The touch point TP may prevent a point touched at the transparent cover 12.

Since the projector 21 displays the target area TA, the user may immediately identify the target area TA matching the touch point TP.

The camera 23 may be installed to face an internal region of the chamber 13. That is, the camera 23 may observe the inside of the chamber 13 in real time to acquire image information inside the chamber 13. The camera 23 may be disposed inside the chamber 13. In more detail, the camera 23 may be disposed inside the upper portion of the chamber 13 and may face the lower side.

The projector 21 may be provided in plurality, which are spaced apart from each other. The plurality of projectors 21 may be disposed to complement blind spots. As a result, a variable area of the target area TA pointed by the projector 21 may be widened.

Also, the camera 23 may be provided in plurality, which are spaced apart from each other. The plurality of cameras 23 may be disposed to complement the blind spots. As a result, a range which is capable of being observed by the camera 23 may be widened.

For example, the plurality of projectors 21 may include a first projector 21a and a second projector 21b which is spaced apart from the first projector 21a. Also, the plurality of cameras 23 may include a first camera 23a and a second camera 23b which is spaced apart from the first camera 23a.

The first projector 21a and the first camera 23a may be disposed above the robot body 14. In more detail, a robot head may be provided on an upper portion of the robot body 14, and the robot head may include the first projector 21a and the first camera 23b.

The robot body 14 may be disposed at a rear portion of the chamber 13, and the first projector 21a and the first camera 23a may face a lower front side. Accordingly, the first projector 21a may display the target area TA on a lower center portion and a lower front portion of the chamber 13, and the first camera 23a may observe the lower center portion and the lower front portion of the chamber 13.

The supporter 17 may stand on the upper portion of the base 11. The supporter 17 may be disposed vertically. The supporter 17 may be disposed in front of the robot body 14. The supporter 17 may be spaced apart from the robot body 14.

The second projector 21b and the second camera 23b may be mounted on the supporter 17. In more detail, the second projector 21b and the second camera 23b may be mounted on the supporter 17. That is, the second projector 21b and the second camera 23b may be disposed above the mounter 18.

The second projector 21b and the second camera 23b may face the rear lower side. Accordingly, the second projector 21b may display the target area TA on a lower center portion and a lower rear portion of the chamber 13, and the first camera 23a may observe the lower center portion and the lower rear portion of the chamber 13.

The robot system according to this embodiment may further include a controller 30. The controller 30 may be a micro-computer or a processor. The controller 30 may be provided in the robot body 14. However, the embodiment is not limited thereto, and the controller 30 may be provided in the base 11 or other components.

The controller 30 may communicate with the touch panel 12b. The controller 30 may receive the touch input of the touch panel 12b. In more detail, the controller 30 may receive or detect coordinates of the touch point TP of the touch panel 12b and may set an area corresponding to the coordinates of the touch point TP as the target area TA. The controller 30 may set an area overlapping the touch point TP in the direction perpendicular to the touch panel 12b as the target area TA.

The controller 30 may communicate with the camera 23. The controller 30 may receive image information obtained from the camera 23. In more detail, the controller 30 may detect the target object based on the image information of the camera 23. The target object may represent the object 16 disposed on the target area TA among the plurality of objects 16. For example, the target object illustrated in FIG. 4 may be the cooking container 16b, and the target object illustrated in FIG. 5A may be the material 16e.

The controller 30 may determine one camera 23 capable of acquiring the image information of the target area TA among the plurality of cameras 23. That is, the controller 30 may determine one camera 23 capable of detecting the target object among the plurality of cameras 23.

The controller 30 can communicate with the projector 21. The controller 30 may control an area pointed by the projector 21. In more detail, the controller 30 may control the projector 21 to emit light to the target area TA.

Also, the controller 30 may determine one projector 21 capable of emitting the light to the target area TA among the plurality of projectors 21. That is, the controller 30 may determine one projector 21 capable of emitting the light to the target object among the plurality of projectors 21.

The controller 30 can communicate with the manipulator 15. The controller 30 may control the manipulator 15. In more detail, the controller 30 may control the manipulator 15 so that the manipulator 15 performs an operation on the target object. The operation may represent an action that is capable of being performed on the target object by the manipulator 15.

The controller 30 may control the manipulator 15 according to types of gesture inputted to the touch panel 12b.

In more detail, when a preset gesture is inputted to the touch panel 12b, the controller 30 may control the manipulator 15 to perform an action corresponding to the gesture.

In more detail, when the preset first gesture is inputted to the touch panel 12b, the controller 30 may control the manipulator 15 to perform a first action corresponding to a first gesture. When a second gesture different from the first gesture is inputted to the touch panel 12b, the controller may control the manipulator 15 to perform a second action that corresponds to the second gesture and is different from the first action.

For example, as illustrated in FIGS. 5B and 5C, the user may input a pinch to zoom gesture into the touch panel. The first gesture may be an operation of spreading two fingers, and the second gesture may be an operation of narrowing two fingers. The first action may be the grip operation of the gripper 15d of the manipulator 15, and the second action may be the release operation of the gripper 15d.

That is, when the pinch-to-zoom gesture is inputted to the touch panel 12b, the controller 30 may control the manipulator 15 so that the gripper 15d grips or releases the object 16. In more detail, as illustrated in FIG. 5A, when the target object is set by touching the touch panel 12b, the manipulator 15 may move to the vicinity of the target object so as to be prepared to grip the target object. In this state, when both the fingers are narrowed as illustrated in FIG. 5B, the controller 30 may control the gripper 15d to grip the target object. Subsequently, as illustrated in FIG. 5C, when the fingers are separated, the controller 30 may control the gripper 15d to release the target object.

In addition, as illustrated in FIG. 5B, the controller 30 may control the manipulator 15 so that the object 16 moves in a direction of a drag gesture when the drag gesture is inputted into the touch panel 12b in the state in which the object 16 is gripped by the griper 15d.

The controller 30 may control the manipulator 15 so that the object 16 moves by a distance between a start point HP1 and an end point HP2 of the drag gesture. That is, the distance between the start point HP1 and the end point HP2 of the drag gesture may be equal to a distance between a start point mp1 and an end point mp2 of a movement path of the object 16 gripped by the gripper 15d. As a result, the user may allow the object 16 gripped by the gripper to intuitively move.

The controller 30 may differently control the manipulator 15 according to the pattern inputted to the touch panel 12b.

In more detail, when a set pattern is inputted to the touch panel 12b, the controller 30 may control the manipulator 15 to perform an action corresponding to the set pattern.

In more detail, when the sett pattern is inputted to the touch panel 12b in the state in which the preset object 16 is gripped by the gripper 15d, the controller 30 may control the manipulator 15 to performs the action corresponding to the set pattern.

For example, as illustrated in FIGS. 6A and 6B, when a zigzag pattern R is inputted into the touch panel 12b in a state in which the knife 16d is gripped by the gripper 15d, the controller 30 may control the manipulator so that the knife 16d gripped by the gripper 15d cuts the material 16e placed on the cooking board 16f.

Also, when the first pattern is inputted into the touch panel 12b, the controller 30 may control the manipulator 15 to perform a first set action corresponding to the first pattern. When a second pattern different from the first pattern is inputted into the touch panel 12b, the controller 30 may control the manipulator 15 to perform a second set action that corresponds to the second pattern and is different from the first set action.

For example, as illustrated in FIGS. 6A and 6B, the user may input the zigzag pattern R into the touch panel 12b. The zigzag pattern R may include a plurality of first paths R1 parallel to each other and a plurality of second paths R2 parallel to each other. The first path R1 and the second path R2 may be alternately inputted. One end point of the pair and the other start point of first paths R1 adjacent to each other may be connected to each other the second path R2.

The first pattern may be a zigzag pattern R in which a distance d1 between the adjacent first paths R1 is relatively far from each other. The second pattern may be a zigzag pattern R in which a distance d2 between the first paths R1 is relatively close to each other. The first set action may be an operation in which the knife 16d gripped by the gripper 15d cuts the material into relatively small pieces. The second set action may be an operation in which the knife 16d gripped by the gripper 15d cuts the material into relatively large pieces.

Thus, the user may more intuitively control the operation by using the object 16 gripped by the manipulator 15.

Figure 8:
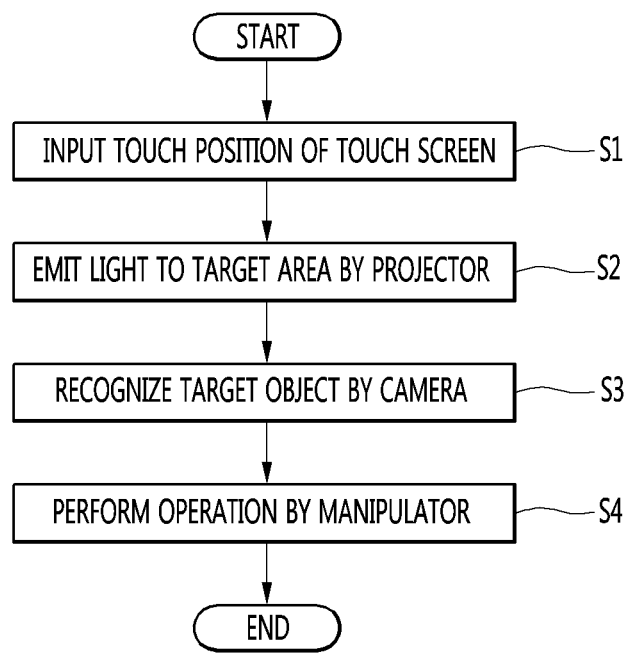
FIG. 8 is a schematic flowchart illustrating a method for controlling a robot system according to an embodiment.

FIG. 8 is a schematic flowchart illustrating a method for controlling a robot system according to an embodiment.

A method for controlling a robot system according to this embodiment may include a setting process (S1), a pointing process (S2), a targeting process (S3), and an operating process (S4).

In the setting process (S1), a controller 30 may set a target area TA corresponding to a touch point TP inputted to a touch panel 12b. As described above, the controller 30 may set an area overlapping the touch point TP in a direction perpendicular to the touch panel 12b as the target area TA. When the user moves or changes the touch point TP of a touch screen 12b, the target area TA may also move or change in real time in response to the movement or change of the touch point TP.

In the pointing process (S2), the controller 30 may control a projector 21 to emit light to the target area TA. When the target area TA moves or changes, the light emitting area of the projector 21 may also move or change in real time in response to the movement or change of the target area TA.

Also, the pointing process (S2) may include a process of determining one projector 21 that is capable of emitting light to the target area TA among the plurality of projectors 21 and a process of emitting light from the one projector 21 to the target area. That is, the controller 30 may preferentially determine one projector 21 that is capable of emitting light to the target area TA among the plurality of projectors 21 and may control the one projector 21 to emit the light to the target area TA. When a plurality of projectors 21 capable of emitting the light to the target area TA are provided, the controller 30 may determine the one projector 21 according to the predetermined priority.

In the targeting process (S3), the controller 30 may recognize the target object disposed on the target area TA based on image information of a camera 23. When the target area TA is changed, the target object may be changed in real time in response to the change of the target area TA.

Also, the targeting process (S3) may include a process of determining one camera 23 which is capable of acquiring the image information of the target area TA among the plurality of cameras 23 and a process of recognizing the target area TA based on the image information of the one camera 23. That is, the controller 30 may preferentially determine one camera 23 which is capable of acquiring image information of the target area TA among the plurality of cameras 23 and a process of recognizing the target object based on the image information of the one camera 23. When a plurality of cameras 23 capable of acquiring the image information of the target area TA are provided, the controller 30 may determine the one camera 23 according to the predetermined priority.

In the operating process (S4), the controller 30 may control a manipulator 15 to perform a preset operation on the target object. When a preset gesture or pattern is inputted into the touch screen 12b during the operating process (S4), the controller 30 may control the manipulator 15 to perform an action corresponding to the gesture or pattern. Since this process has been described in detail above, description thereof will be denoted from the above-described description.

Figure 9:
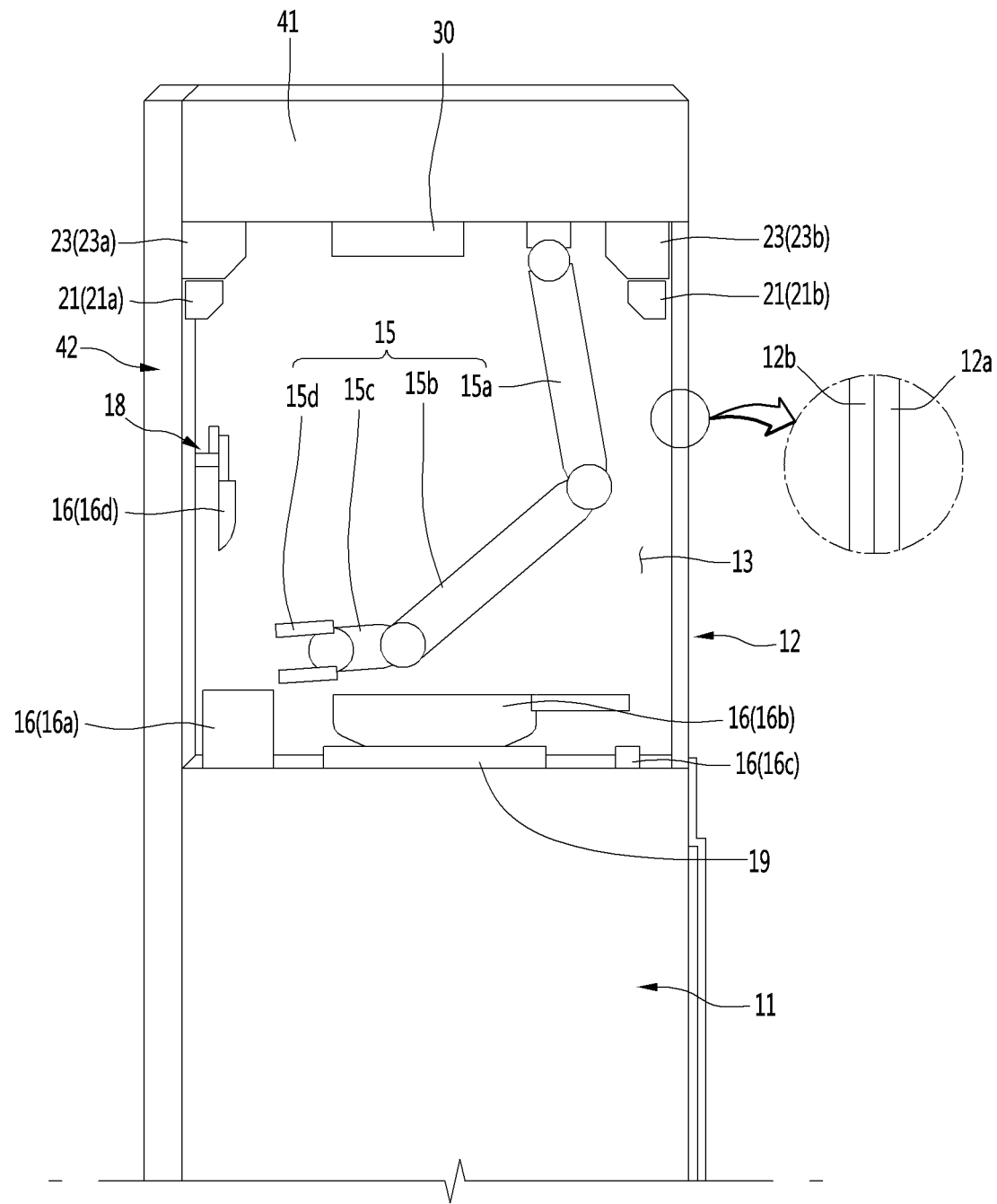
FIG. 9 is a schematic view of a robot system according to another embodiment.

FIG. 9 is a schematic view of a robot system according to another embodiment.

Hereinafter, contents duplicated with the foregoing embodiment will be omitted, and differences will be mainly described.

A robot system according to this embodiment may include a ceiling 41 disposed on a transparent cover 12 to cover a top surface of a chamber 13, instead of the robot body 14 described above.

The ceiling 41 may be connected to a base 11 by a rear body 42. The rear body 42 may cover a rear surface of the chamber 13. A mounter 18 may be disposed on the rear body 42.

A first projector 21a and a first camera 23a may be mounted on a rear portion or the rear body 42 of the ceiling 41. A second projector 21b and a second camera 23b may be mounted to a front portion of the ceiling 41.

The manipulator 15 may be supported by being hung on the ceiling 41.

The transparent cover 12 may cover at least a portion of a circumferential surface of the chamber 13. A touch panel 12b may be provided on at least one of a front, one side surface, or opposite side surface of the transparent cover 12.

The controller 30 may be provided on the ceiling 41. However, the embodiment is not limited thereto, and the controller 30 may be provided on the base 11 or the rear body 42.

According to the exemplary embodiments, the projector may emit the light to the target area so that the user immediately identifies the target area within the chamber through the transparent cover. Thus, the real-time feedback on the user's control may be provided.

Also, since the manipulator is disposed within the chamber inside the transparent cover, the user may be injured by the driving of the manipulator.

Also, the target area may overlap the touch point in the direction perpendicular to the touch panel. Therefore, the user may intuitively recognize and control the target area.

In addition, the action of the manipulator may vary according to the pattern and the gesture inputted into the touch panel. Therefore, the user may easily and intuitively control the manipulator.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the disclosure but by the appended claims, and all differences within the scope will be construed as being included in the present disclosure.

What is claimed is:

1. A robot system comprising:
    a manipulator configured to perform a preset operation on a plurality of objects;
    a transparent cover configured to define a chamber in which the plurality of objects and the manipulator are accommodated, the transparent cover being provided with a touch panel;
    a camera installed to face an internal region of the chamber;
    a projector configured to emit light to one area within the chamber; and
    a controller configured to control the projector so that the projector emits the light to a target area corresponding to a touch point of the touch panel, recognize a target object disposed in the target area based on image information of the camera, and control the manipulator so that an operation is performed on the target object.

2. The robot system according to claim 1, wherein the target area overlaps the touch point in a direction perpendicular to the touch panel.

3. The robot system according to claim 1, wherein the controller controls, when a preset first gesture is inputted into the touch panel, the manipulator to perform a first action corresponding to the first gesture, and
    controls, when a preset second gesture different from the preset first gesture is inputted into the touch panel, the manipulator to perform a second action corresponding to the preset second gesture and different from the first action.

4. The robot system according to claim 1, wherein the manipulator comprises:
    a plurality of arms; and
    a gripper provided on an end arm of the plurality of arms, and
    the controller controls, when a preset pattern is inputted into the touch screen in a state in which a preset object is gripped by the gripper, the manipulator to perform an action corresponding to the preset pattern.

5. The robot system according to claim 1, wherein the manipulator comprises:
    a plurality of arms; and
    a gripper provided on an end arm of the plurality of arms, and
    the controller controls, when a pitch-to-zoom gesture is inputted into the touch panel, the manipulator to allow the gripper to grip or release the target object.

6. The robot system according to claim 5, wherein the controller controls, when a drag gesture is inputted into the touch panel in a state in which the target object is gripped by the gripper, the manipulator to allow the target object to move in a direction of the drag gesture.

7. The robot system according to claim 6, wherein the controller controls the manipulator to allow the target object to move by a distance between a start point and an end point of the drag gesture.

8. The robot system according to claim 1, wherein the projector is provided in plurality, which are spaced apart from each other to supplement a blind spot, and
    the camera is provided in plurality, which are spaced apart from each other to supplement a blind spot.

9. The robot system according to claim 1, further comprising:

a base disposed below the transparent cover to cover a bottom surface of the chamber; and a robot body which is seated on the base and on which the manipulator is mounted, wherein the transparent cover covers at least a portion of a circumferential surface of the chamber and a top surface of the chamber.

10. The robot system according to claim 1, further comprising:

a base disposed below the transparent cover to cover a bottom surface of the chamber; and a ceiling which is disposed above the transparent cover to cover a top surface of the chamber and on which the manipulator is hung to be supported, wherein the transparent cover covers at least a portion of a circumferential surface of the chamber.

11. A method for controlling a robot system, the method comprising:

setting a target area corresponding to a touch point inputted into a touch panel provided on a transparent cover;

performing pointing on the target area, which is disposed within a chamber covered by the transparent cover, by using a projector;

performing targeting to recognize a target object disposed on the target area based on image information of the camera; and performing a preset operation on the target object by using a manipulator accommodated in the chamber.

12. The method according to claim 11, wherein, during the preset operation, when a preset first gesture is inputted into the touch panel, the manipulator performs a first action corresponding to the preset first gesture, and when a preset second gesture different from the preset first gesture is inputted into the touch panel, the manipulator performs a section action corresponding to the preset second gesture and different from the first action.

13. The method according to claim 11, wherein the manipulator comprises:

a plurality of arms; and a gripper provided on an end arm of the plurality of arms, and during the preset operation, when a preset pattern is inputted into the touch screen in a state in which a preset object is gripped by the gripper, the manipulator performs an action corresponding to the preset pattern.

14. The method according to claim 11, wherein the manipulator comprises:

a plurality of arms; and a gripper provided on an end arm of the plurality of arms, and during the preset operation, when a pinch-to-zoom gesture is inputted into the touch panel, the gripper grips or releases the target object.

15. The method according to claim 14, wherein, during the preset operation, when a drag gesture is inputted into the touch panel in a state in which the target object is gripped by the gripper, the manipulator allows the target object to move in a direction of the drag gesture.

16. The method according to claim 15, wherein the manipulator allows the target object to move by a distance between a start point and an end point of the drag gesture.

17. The method according to claim 11, wherein the projector is provided in plurality, which are spaced apart from each other to supplement a blind spot, and the performing of the pointing comprises:

determining one projector that is capable of emitting light to the target area among the plurality of protectors; and emitting the light to the target area by using the one projector.

18. The method according to claim 11, wherein the camera is provided in plurality, which are spaced apart from each other to supplement a blind spot, and the performing of the targeting comprises:

determining one camera that is capable of acquiring image information of the target area among the plurality of cameras; and recognizing the target area based on the image information of the one camera.

* * * * *